United States Patent [19]
Meltzer

[11] 3,880,862
[45] Apr. 29, 1975

[54] 6β-AZIDO-17-CYCLOALKYLMETHYL-4,5α-EPOXYMORPHINAN-3-OLS

[75] Inventor: Robert I. Meltzer, Rockaway, N.J.

[73] Assignee: Warner-Lambert Company, Morris Plains, N.J.

[22] Filed: Aug. 31, 1973

[21] Appl. No.: 393,377

[52] U.S. Cl.................................. 260/285; 424/260
[51] Int. Cl.[2]........................................ C07D 43/28
[58] Field of Search..................................... 260/285

[56] References Cited
UNITED STATES PATENTS
3,318,885  5/1967  Brown et al. ...................... 260/285

OTHER PUBLICATIONS
Bognar et al., Chemical Abstracts, Vol. 71, 13243x, 1969.
Bognar et al., Chemical Abstracts, Vol. 71, 3515y, 1969.

Primary Examiner—Donald G. Daus
Assistant Examiner—Mary Vaughn
Attorney, Agent, or Firm—Albert H. Graddis; Frank S. Chow

[57] ABSTRACT

The present invention relates to novel 6β-azido-17-cycloalkylmethyl-4,5α-epoxymorphinan-3-ols having the following structural formula:

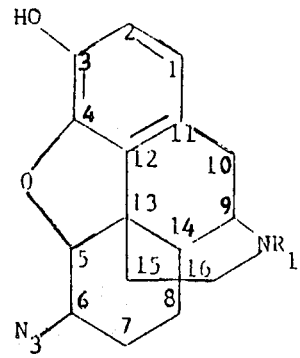

in which $R_1$ is cycloalkylmethyl such as, for example, cyclopropylmethyl. These compounds are useful as analgesics.

2 Claims, No Drawings

6β-AZIDO-17-CYCLOALKYLMETHYL-4,5α-EPOXYMORPHINAN-3-OLS

The present invention relates to novel morphine derivatives and, more particularly, the present invention relates to 6β-azido-17-cycloalkylmethyl-4,5α-epoxymorphinan-3-ols, having the following structural formula:

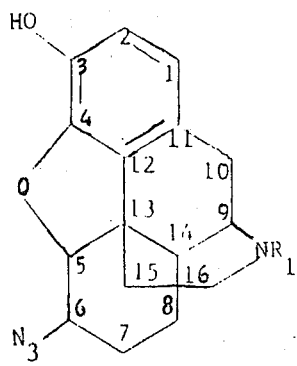

wherein $R_1$ is cycloalkylmethyl having 4 to 7 carbon atoms.

The present invention also includes within its scope pharmaceutically acceptable acid addition salts of these novel azidomorphine derivatives.

The compounds of this invention are useful as analgesics and antitussive agents. They may be administered parenterally or orally for the management of pain in any of the usual pharmaceutical forms including tablets, capsules, powders, suspensions, solutions, syrups and the like. Particularly valuable formulations include sustained release preparations which may be compounded by any of the known procedures. Generally, these compounds are effective in effecting analgesia at a dosage of from about 0.1 to about 0.5 mg per kg of body weight. As with any analgesic agent, the dosage should be adjusted to the severity of the indication and the degree of response. Moreover, the dose may be repeated as appropriate depending upon the nature of the particular formulation, the response and the condition of the patient.

According to the present invention the above compounds are prepared by reducing 4,5α-epoxy-17-cycloalkylmethyl-7,8-didehydromorphinan-3,6α-diol by catalytic hydrogenation. The reduced product is then acetylated to give the corresponding 3-acetoxy derivative. The acetoxy derivative is converted to the corresponding 6α-tosyloxymorphinan by treatment with tosylchloride. Treatment of the tosyl derivative with sodium azide yields the desired compounds of this invention.

The starting compound is disclosed in Gates, et al., J. Med. Chem. 7, 127 (1964).

Further embodiment of the present invention includes the acid addition salts prepared from pharmaceutically acceptable non-toxic acids. Such pharmaceutically acceptable non-toxic acid addition salts include those derived from organic and inorganic acids such as, without limitation, hydrochloric, hydrobromic, sulfuric, phosphoric, methanesulfonic, acetic, lactic, succinic, malic, maleic, aconitic, phthalic, tartaric, embonic and like acids.

In order to further illustrate the practice of this invention, the following examples are included:

EXAMPLE 1

Preparation of 17-Cyclopropylmethyl-4,5α-epoxymorphinan-3,6α-diol

To a solution of 21 g. of 4,5α-epoxy-17-cyclopropylmethyl-7,8-didehydromorphinan-3,6α-diol in 300 ml of water and 6 ml of 37% hydrochloric acid is added 1.6 g. of 10% palladium on carbon. The mixture is shaken under 1–2 atm. of hydrogen at 25°C until one molar equivalent is absorbed. The catalyst is removed by filtration. The bulk of the aqueous filtrate is used directly in the acetylation described in Example 2. However, an aliquot evaporated under vacuum is shown to give the hydrochloride hydrate which loses water above 100°C and decomposes between 260° and 280°C. The hydrochloride hydrate is dissolved in water and precipitated with ammonium hydroxide, filtered and dried, mp 140°–142°C. Thin layer chromatography shows this to be about 80–90% pure.

EXAMPLE 2

Preparation of 3-Acetoxy-17-cyclopropylmethyl-4,5α-epoxymorphinan-6α-ol

To 18 g of 17-cyclopropyl-4,5α-epoxymorphinan-3,6α-diol in 1,300 ml of water are added 150 g of solid sodium bicarbonate with stirring. Then four 17 ml portions of acetic anhydride are added in succession, waiting only for foaming to subside between additions. The mixture is stirred 2 hours at room temperature and extracted with three 1,500 ml portions of chloroform. The organic extracts are combined, dried over magnesium sulfate, filtered and evaporated under vacuum leaving 14 g of an oil. This material shows only one infrared band in the vicinity of 1,770 $cm^{-1}$ thus indicating mono acetylation.

EXAMPLE 3

Preparation of 3-Acetoxy-17-cyclopropylmethyl-4,5α-epoxy-6α-tosyloxymorphinan

To a solution of 14 g crude 3-acetoxy-17-cyclopropylmethyl-4,5α-epoxymorphinan-6α-ol in 100 ml of pyridine, are added 9 g of tosyl chloride in 60 ml pyridine over a 30 minute period at 0°C. After 2 hours in the cold and 16 hours at 25°C the mixture is poured into 1.5 l. of saturated sodium bicarbonate solution and extracted with two 1.5 l. portions of ether. The combined extracts are washed with a saturated solution of sodium chloride, dried, filtered, and evaporated. Recrystallization from ethyl acetate gives 5.0 g of a pink solid. Infrared bands are present at 1,180, 1,190 and 1,350 $cm^{-1}$.

EXAMPLE 4

Preparation of 6β-Azido-17-cyclopropylmethyl-4,5α-epoxymorphinan-3-ol

To a solution of 4.0 g of 3-acetoxy-17-cyclopropylmethyl-4,5α-epoxy-6α-tosyloxy-morphinan in 150 ml dimethylformamide are added 8 g of sodium azide, and 20 ml of water. After heating 24 hours at 80°C the mixture is cooled, poured into 900 ml of water, extracted with two 1 l. portions of ether which is washed, dried, filtered and evaporated to give 2.0 g of an oil. The oil is dissolved in 15 ml of ether, refrigerated 16 hours and filtered. The filtrate is evaporated, the residue dissolved in 50 ml isopropyl ether at 50°C, cooled and filtered. This filtrate is then evaporated, the residue stirred thoroughly in 50 ml of petroleum ether at 40°C, cooled, filtered and the filter cake dried to give 650 mg, of a pale yellow solid showing a strong infrared band at 2,090 cm$^{-1}$ and UV maxima at 207 m$\mu$ and 283 m$\mu$. $[\alpha]_D^{25} = -177.7°$ (C=1 in MeOH).

Anal. Calcd for $C_{20}H_{24}N_4O_2$: C, 68.16; H, 6.86; N, 15.90.

Found: C, 67.57; H, 7.28; N, 15.21.

I claim:

1. A compound of the formula:

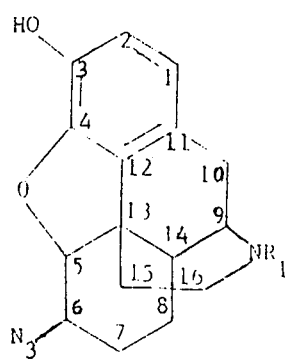

wherein $R_1$ is cycloalkylmethyl having 4 to 7 carbon atoms and the pharmaceutically acceptable acid addition salts.

2. A compound according to claim 1 wherein said cycloalkylmethyl is cyclopropylmethyl.

* * * * *